Patented June 4, 1935

2,003,656

UNITED STATES PATENT OFFICE 2,003,656

CEMENT PRODUCT AND METHOD OF MAKING THE SAME

Howard R. Starke, Riverside, Calif., assignor to Riverside Cement Company, Los Angeles, Calif., a corporation of Delaware No Drawing. Application January 4, 1933, Serial No. 650,165

8 Claims. (Cl. 106—25)

This invention relates to a cement product or composition consisting principally of Portland cement, together with certain proportions of added materials, and to the method of making such a cement product or composition.

In general, the principal objects of this invention are to provide a cement product possessing advantageous properties and to provide an advantageous method of manufacturing such a product at a minimum cost.

An important object of the invention is to provide a cement product having improved properties such as greater plasticity, increased sand carrying capacity, and much higher degree of workability than ordinary Portland cement, together with highly satisfactory strength and durability after setting, and a high capacity for retaining water during curing and for absorbing water applied to the surface thereof during curing. Such improved properties are believed to be due in part directly to the presence of certain materials which are added to the cement material proper in the process of manufacture, as hereinafter described, and in part to a greater fineness or specific surface, or a more advantageous particle size distribution, resulting from such process of manufacture. Inasmuch as the admixture of the above-mentioned additional materials and the grinding of the cement in the presence of such materials has been found to contribute very materially to the obtaining of the desired fineness, specific surface, or particle size distribution, it is evident that such added materials are very largely responsible, either directly or indirectly, for the improved properties of the finished product.

A further object of the invention is to provide a novel process by which Portland cement products having advantageous properties of fineness or specific surface may be produced with a minimum time of grinding, expenditure of power, and hence at minimum cost. Practical advantages may thus be gained, either in the manufacture of a product of increased fineness or specific surface without increasing the duration of power consumption of the grinding operation, or in a reduction of the time and power required to produce a product having a certain fineness or specific surface, or in both of these ways. It is well known that increasing the fineness or specific surface of Portland cement leads to marked improvements in the properties thereof, for example by enhancing the working properties of the cement, such as plasticity, workability, sand carrying capacity, etc., or by improving the properties of cementitious or concrete bodies formed therewith, such as mechanical strength, durability, imperviousness to water and other fluids, etc. It is obviously of advantage, therefore, to provide means whereby relatively high fineness and specific surface may be combined with relatively low cost of grinding.

A further object is to provide for manufacture of a Portland cement product of normal fineness or specific surface, with a materially shorter time of grinding and a consequent considerable saving in energy over that heretofore required to produce such normal fineness or specific surface.

Another important object of the invention is to provide a cement product which is particularly adapted for use in exterior plastering or "stuccoing" of buildings. One of the principal requisites of such a cement is that it shall have high plasticity and workability. A number of cements heretofore proposed have had fairly good plasticity and workability, but most plastic cements are open to the objection that they are difficultly penetrated by water and have a relatively low capacity for retaining water during curing thereof. One of the main advantages of the cement of the present invention is that it combines high plasticity and workability with abnormally high capacity for retaining moisture and for absorbing water sprinkled or otherwise applied to the surface thereof during curing. The increased ability to retain and absorb moisture is of considerable practical advantage, in a cement of this type, since it promotes curing of the cement and development of strength therein.

A further object of the invention is to eliminate coating of the grinding media and the walls of the grinding apparatus with ground material, thus maintaining the grinding media and grinding apparatus at uniformly high efficiency. This may be regarded as an important factor in the high efficiency of grinding obtainable by this invention, which, as above stated, may be reflected either in improved properties of the product or in a reduction of the cost of grinding, or both. Furthermore, the temperature of the material during grinding does not rise as high as it ordinarily would, due to the fact that a greater weight of material may be passed through the mill in a given unit of time, and the total energy turned into heat during this unit of time is thus distributed over a larger mass of material. This decrease in the temperature to which the material is heated during grinding still further improves the properties of the finished product, and particularly the setting properties thereof. Also, the prevention of coating eliminates the necessity of periodically interrupting the grinding operation for the purpose of removing the coating of finely ground material which, under ordinary conditions, tends to form on both the mill lining and the grinding media.

The product of the present invention comprises a finely ground mixture containing Portland cement, together with a very small proportion of oleaginous material such as a fatty acid, preferably oleic acid, and also containing a suitable proportion of inert mineral material other than Portland cement material, such as sand, which mineral material acts, in part at least, as a carrier or distributing agent for the oleic acid or other oleaginous material. Both the oleaginous material and the inert mineral material are interground with the cement.

The term "oleic acid" as used herein is understood to include either pure or commercial oleic acid, and in general any material consisting principally of oleic acid, for example, the material known commercially as "red oil" and containing oleic acid together with varying amounts of other fatty acids or other impurities. Only a very small proportion of oleic acid or other oleaginous material is preferably used in accordance with this invention, as I have found that for the purposes above-mentioned the use of a small proportion thereof produces much better results than are obtained by the use of increased amounts thereof. The proportion of such material used should be between .05% and 1% of the total product, and preferably between 0.1% and 0.5%. For example, I have found that with the Portland cement on which tests have been made very advantageous results are obtained by the addition of about .15% of oleic acid, in conjunction with a suitable quantity of inert mineral material.

Instead of oleic acid I may use other fatty acids, such as butyric acid. Examples of other oleaginous materials which may be used are the fatty oils, such as cottonseed oil or cocoanut oil. Materials of an oleaginous nature, which are solid at ordinary temperatures, but which become liquid at temperatures encountered in the grinding of cement, for example, at temperatures up to about 300° F., may also be used. As examples, I may use palmitic acid, stearic acid, or maleic acid.

In general, the term "oleaginous material" is used herein to include any material of an oily or fatty nature, which is either liquid at ordinary temperature, or solid at ordinary temperature but adapted to liquefy at temperatures such as above-mentioned.

The inert mineral material added to the cement may comprise sand or other siliceous material, or limestone. Such material may be added in amounts up to 30% or more of the total weight of the product, but the proportion of this material is preferably between 5 and 20%, and I have found that particularly good results are obtained by the use of approximately 15% of said material.

It will be understood that the product may also contain any other added ingredients such as are commonly used for controlling the setting time or other properties of the cement, such as gypsum or other calcium sulfate compound. While the use of such other ingredients is not essential and does not constitute a part of this invention, it may be said that in general I prefer to add to the cement, before grinding, gypsum in the amount of from 1 to 5% by weight of the finished product.

It is an esential feature of this invention that the Portland cement be finely interground with the added oleic acid or other oleaginous material and with the inert mineral carrier, and for this purpose said oleic acid, or other oleaginous material, and said inert mineral carrier are mixed with the clinker prior to the completion of the grinding thereof and the mixture is interground to the desired fineness. The added materials may be incorporated with the unground Portland cement clinker formed in the usual manner and then ground therewith, or may be added to partially ground clinker before the final grinding thereof to the desired fineness.

In general, I find it advantageous to mix the oleic acid or other oleaginous material with the inert mineral carrier and cause the same to be thoroughly distributed therein prior to the mixing of these materials with the Portland cement. This is of advantage in promoting uniform distribution and admixture of the oleaginous material throughout the cement, both during the grinding operation and in the finished product, and such advantage is of particular importance in connection with the use of solid oleaginous materials, which might otherwise be distributed and intermixed with considerable difficulty.

In aplying the invention to the manufacture of a product having improved properties due to increased fineness or specific surface, the mixture of cement and added materials is ground to a higher degree of fineness or specific surface than ordinary Portland cement, and is preferably subjected to a grinding operation of such nature and duration that the percentage of relatively coarse particles is lower than in any cement heretofore known commercially. Analyses of the fineness or particle size of certain cement products produced in accordance with this invention, such analyses being made by methods based on the rate of settling thereof, as hereinafter described, have indicated that such products contain materially less than 1% of particles exceeding 50 microns in diameter, and materially less than 5% of particles exceeding 40 microns in diameter, whereas normal Portland cements heretofore produced commercially have ordinarily contained upwards of 10% of particles above 50 microns in diameter and upwards of 20% of particles above 40 microns in diameter. Calculation of the specific surface of a number of these products have shown them to have specific surface values of over 2100 sq. cm. per gm., and in some cases over 2200 sq. cm. per gm.

Normal Portland cements are usually defined as to particle size by the expression "percent passing through a 200 mesh screen." The diameter of the openings in a 200 mesh screen is 0.074 mm. or, more properly stated, 74 microns. Thus, in the hereunto attached tables, the expression "+74 microns" denotes material which will not pass through a 200 mesh screen, and the expression "—74+60 microns" denotes material passing through a 200 mesh screen but no smaller than 60 microns in diameter, and so forth.

On the other hand, in applying this invention to the production of cement products of normal fineness or particle size, the time of grinding of the mixture of cement material and added material, in a mill of any given size and suitable type, may be much shorter than in ordinary methods, as will be evident from the data tabulated hereinafter, and the power consumption is correspondingly reduced.

It has been found, however, that cement products made in accordance with this invention, whether ground to normal or increased fineness or specific surface, uniformly contain a larger percentage of their weight in particles of intermediate sizes, and particularly, of particles between 10 and 30 microns in diameter. It is possible, by my invention, to produce cement products containing materially in excess of 40% by weight of particles between 10 and 30 microns in diameter, whereas a considerable number of Portland cements heretofore produced, when analyzed by the same methods, were all found to contain materially less than 40% by weight of particles within this range. This increase in proportion of particles within this intermediate size range, resulting in a lowered proportion of relatively low strength coarser particles and also avoiding excessive production of the extremely fine particles whose formation requires expenditure of power out of all proportion to the increased strength imparted thereby, is of distinct advantage in producing a cement having an optimum combination of strength, plasticity and other properties with a low power requirement for grinding.

In an article on "The influence of the fine particle structure on the strength properties of Portland cement", in Zement, Vol. 19, pages 607–8 (1930), Dr. Hans Kuhl shows that a cement of intermediate particle size, say from about 30 microns down to 15 microns, gives the greatest ratio of strength to specific surface, and the significance of this is readily apparent if it is borne in mind that specific surface values afford an accurate measure of power consumption in grinding. As the particle size increases above 30 microns, the strength decreases more rapidly than does the specific surface or power expenditure. On the other hand, it is shown by Kuhl to be quite uneconomical to grind to particle sizes below 10 microns, as in this range the specific surface and power expenditure increase much more rapidly than does the strength.

An example of a preferred method of making a cement composition in accordance with this invention is as follows: 0.35 part by weight of oleic acid is mixed with 15 parts by weight of sand and these ingredients are thoroughly intermixed with one another and then added to Portland cement clinker, preferably with a suitable percentage of gypsum, in sufficient total amount to make 100 parts by weight of finished product. For example, I may use 3.5 parts by weight of gypsum and 81.15 parts by weight of Portland cement clinker. The mixture is then ground in a ball mill or other suitable grinding apparatus, for a suitable period of time, until the desired fineness of product is attained. No exact time of grinding can be specified, as this will depend upon the type of grinding apparatus and the speed of operation thereof, as well as other factors, but it may be said that when grinding in a small laboratory size ball mill, grinding of this mixture for 4000 revolutions has been found to give a product of equal or greater fineness or specific surface than the product obtained by grinding a batch of the same clinker, without the oleaginous material, for 7000 revolutions, and that by grinding the cement with the said mixed materials for 7000 revolutions a very much greater degree of fineness was obtained.

In order to illustrate the effect of the addition of oleaginous material and inert mineral carrying material on the fineness of the ground product, a series of tests were made in which different percentages of oleic acid and sand were added to portions of the same batch of Portland cement clinker and the clinker then ground in a laboratory size ball mill. Gypsum was also added in each case in the proportions given. In Table No. 1 below, the period of grinding was uniform throughout, and the grinding mill used, as well as other conditions of grinding, were essentially the same, except for the presence of the different quantities of added materials. The time of grinding was also kept constant in all of these tests, so as to determine more particularly the increase in fineness or specific surface, and the decrease in mill coating obtainable by the addition of the oleaginous material and the inert mineral material. In each case the tendency of the ground material to coat the grinding balls was measured by determining the weight of the material which had adhered to the balls. The percentage of the original charge so adhering was calculated and reported in the table as percentage ball coating. The ground material was then analyzed for fineness by measuring the rate of settling or sedimentation thereof in a suitable liquid medium, employing an apparatus such as shown in patent of Robert T. Knapp, No. 1,838,628, and the percentages of material within certain ranges of particle diameter, as well as the total specific surface of the material, in square centimeters per gram, were calculated in accordance with the principles and mathematical analysis discussed in "Chemistry of the Colloidal State" by John C. Ware, Chapter II.

The term "specific surface" designates the total surface area of all the particles contained in a unit mass of the material having the average particle size distribution as calculated from the rate of settling in the above apparatus. The table also shows the total percentage by weight of each product above 50 microns, the total percentages above 40 microns, and the total between 10 and 30 microns.

TABLE I

| Identification of product | A | B | C | D | E | F | G | H |
|---|---|---|---|---|---|---|---|---|
| Description of product | Clinker +3.5% gypsum | Clinker +3.5% gypsum +.15% oleic acid | Clinker +3.5% gypsum +.35% oleic acid | Clinker +3.5% gypsum +.60% oleic acid | Clinker +3.5% gypsum +15% sand | Clinker +3.5% gypsum +15% sand +.15% oleic acid | Clinker +3.5% gypsum +15% sand +.35% oleic acid | Clinker +3.5% gypsum +15% sand +.60% oleic acid |
| Mill revolutions | 7000 | 7000 | 7000 | 7000 | 7000 | 7000 | 7000 | 7000 |
| % ball coating | 5.0 | 1.4 | 0.0 | 0.0 | 2.6 | 2.3 | 0.0 | 0.0 |
| Particle diameter: | | | | | | | | |
| % +74 microns | 3.5 | 0.2 | 0.2 | 0.1 | 1.0 | 0.1 | 0.1 | 0.1 |
| % −74+60 do | 3.9 | 0.0 | 0.0 | 0.0 | 2.0 | 0.0 | 0.0 | 0.0 |
| % −60+50 do | 6.8 | 0.0 | 0.0 | 2.5 | 3.9 | 0.0 | 0.0 | 0.0 |
| % −50+40 do | 9.7 | 1.8 | 1.8 | 3.5 | 8.4 | 0.9 | 0.9 | 0.9 |
| % −40+30 do | 10.6 | 8.0 | 5.0 | 8.0 | 11.4 | 7.0 | 4.0 | 7.5 |
| % −30+25 do | 7.2 | 8.0 | 6.0 | 7.0 | 7.4 | 7.5 | 5.5 | 6.0 |
| % −25+20 do | 7.2 | 11.0 | 9.5 | 9.0 | 9.4 | 11.0 | 9.0 | 9.5 |
| % −20+15 do | 8.7 | 12.5 | 13.0 | 11.5 | 8.9 | 12.5 | 14.5 | 12.5 |
| % −15+10 do | 9.6 | 14.5 | 16.0 | 14.5 | 11.9 | 14.0 | 17.5 | 16.0 |
| % −10+8 do | 5.8 | 7.5 | 8.5 | 8.5 | 4.0 | 5.0 | 7.5 | 7.0 |
| % −8 do | 27.0 | 36.5 | 40.0 | 36.0 | 31.7 | 42.0 | 41.0 | 40.5 |
| Total %+50 do | 14.2 | 0.2 | 0.2 | 2.6 | 6.9 | 0.1 | 0.1 | 0.1 |
| Total %+40 do | 23.9 | 2.0 | 2.0 | 6.1 | 12.3 | 1.0 | 1.0 | 1.0 |
| Total %−30+10 do | 32.7 | 46.0 | 44.5 | 42.0 | 37.6 | 45.0 | 46.5 | 44.0 |
| Specific surface (sq. cm. per gm.) | 1593 | 2043 | 2175 | 2021 | 1787 | 2198 | 2243 | 2195 |

It will be seen from the above table that each of the cement products B, C, D, F, G and H, which were ground in the presence of added oleic acid, had a materially greater fineness and a materially higher specific surface than the cement products A and E, which were ground in the absence of such added material. It will also be noted that the cement product E, which was ground in the presence of added sand, without oleic acid, had a greater fineness and higher specific surface than the cement product A, which was ground without either sand or oleic acid, but that the further addition of oleic acid along with the sand, as in F, G and H, again produced increased fineness and higher specific surface. Furthermore, for a given percentage of oleic acid, a greater degree of fineness and a higher specific surface were obtained in the products which also contained added sand than in the products which did not contain sand; for example, product G had a greater fineness and specific surface than product C. The specific surface of a cement product has been found to play an important part in determining the plasticity, workability, and sand carrying capacity of the cement as well as the strength of cementitious bodies formed therewith, and it is evident therefore that the cement product C, having a specific surface of 2175 sq. cm. per gm., as obtained by the use of .35% oleic acid, and the cement product G, having a specific surface of 2243 sq. cm. per gm., as obtained by the use of 15% sand and .35% oleic acid should be decidedly superior to the cement product A having a specific surface of only 1593 sq. cm. per gm., as obtained by grinding the same clinker without either of these added materials. This superiority has been borne out in practice and it has been found that these cements of high specific surface, produced in accordance with this invention by grinding for approximately the same period of time or the same number of mill revolutions as is required to produce normal Portland cement of ordinary fineness, possess much greater plasticity, workability, and sand-carrying capacity than are possessed by such normal Portland cement of ordinary fineness.

It will also be noted from the above table that the cement products F, G and H, ground with each of the three different percentages of oleic acid and sand, each contained materially less than 1% of particles exceeding 50 microns in diameter, and materially less than 5% of particles exceeding 40 microns in diameter, and the presence of this minimum proportion of these relatively coarse particles is considered as constituting an important feature of novelty of this invention. Products A and D, containing no added oleaginous material, showed proportions of particles above these sizes far in excess of these figures. Furthermore, it will be noted that product G, which represents a preferred embodiment of the invention, had a specific surface exceeding 2200 sq. cm. per gm.

Also, products A and D, containing no added oleaginous material, had less than 40% of their weight between 10 and 30 microns, while all of the products prepared in accordance with this invention exceeded this percentage between these limits.

Some tests were also made to illustrate more particularly the effect of the added oleaginous material, in reducing the time of grinding required to secure a product of a given degree of fineness and specific surface, and to also further illustrate the advantageous particle size distribution resulting from the addition of such material. The preparation of the samples and the determination of the fineness and specific surface thereof were conducted substantially as above described with the exception that the number of revolutions of the grinding mill was varied in different tests. The results of these tests, together with the number of mill revolutions in each case are given below in Table II.

TABLE II

| Identification of product | N | O | P | Q |
|---|---|---|---|---|
| Description of product | Clinker+ 3.5% gypsum+ 15% sand | Clinker+ 3.5% gypsum+ 15% sand | Clinker+ 3.5% gypsum+ 15% sand +0.35% oleic acid | Clinker+ 3.5% gypsum+ 15% sand +0.35% oleic acid |
| Mill revolutions | 7000 | 10500 | 4000 | 7000 |
| % ball coating | 2.4 | 4.3 | 0.0 | 0.0 |
| Particle diameter: | | | | |
| % +74 microns | 2.0 | 0.3 | 0.8 | 0.2 |
| % −74+60 do | 1.0 | 1.7 | 0.0 | 0.0 |
| % −60+50 do | 4.4 | 3.5 | 0.2 | 0.0 |
| % −50+40 do | 10.8 | 6.5 | 5.0 | 0.8 |
| % −40+30 do | 11.3 | 11.5 | 11.5 | 5.0 |
| % −30+25 do | 7.8 | 6.5 | 8.5 | 5.5 |
| % −25+20 do | 7.8 | 7.5 | 12.0 | 10.5 |
| % −20+15 do | 9.3 | 10.0 | 13.0 | 13.5 |
| % −15+10 do | 10.3 | 11.0 | 14.0 | 17.0 |
| % −10+ 8 do | 5.4 | 5.0 | 5.5 | 8.5 |
| % −8 do | 29.9 | 36.5 | 29.5 | 39.0 |
| Total %+50 do | 7.4 | 5.5 | 1.0 | 0.2 |
| Total %+40 do | 18.2 | 12.0 | 6.0 | 1.0 |
| Total %−30+10 do | 35.2 | 35.0 | 47.5 | 46.5 |
| Specific surface (sq. cm. per gm.) | 1730 | 1945 | 1808 | 2185 |

From Table II it is evident that grinding for 4000 mill revolutions with 0.35% oleic acid in addition to 15% sand gave a product of greater fineness and specific surface than was obtained by grinding for 7000 mill revolutions with 15% sand but with no oleic acid, and also that grinding for 7000 mill revolutions with 0.35% oleic acid in addition to 15% sand gave a product having a greater fineness and specific surface than was obtained by grinding for 10,500 mill revolutions with the same proportion of sand but with no oleic acid.

Also, the above-mentioned important difference in particle size distribution may again be noted between the products ground with added oleaginous material and those ground without. Furthermore, the products ground with oleaginous material again all contained materially in excess of 40% by weight of particles between 10 and 30 microns and those ground without such material contained materially less than 40% within this range.

A comparison may be made, for example, between products N and P, or between products O and Q, while a still more striking comparison may be made between products O and P. The former, ground for 10,500 revolutions without oleaginous material but with 15% sand, had a specific surface of 1945 sq. cm. per gm., but contained only 35.0% within this advantageous intermediate range, while the latter, ground for only 4000 revolutions with added oleaginous material in addition to the sand, had a somewhat lower specific surface but contained 47.5% within this range. It is evident, therefore, that the addition of the oleaginous material, together with sand, results in an increased proportion of material within the range of particle size where the greatest advantages are gained in ratio of strength to power expenditure, and that this is true regardless of the average fineness, or specific surface, to which the entire product is ground.

It is quite evident, therefore, that the nature and magnitude of the effect produced by the addition of the oleaginous material, along with the inert material, is remarkable, particularly in view of the very minute proportion of such oleaginous material required to produce this effect. While I am uncertain as to the exact physical nature of the phenomenon on which this action is dependent, and while this invention is not to be considered as restricted to any particular underlying theory, I am at present of the opinion that the oleaginous material exerts an electrical effect upon the cement particles, causing them to repel instead of attract each other which in turn causes them not only to act differently during the grinding operation, but also increases the ease with which the particles, when subsequently gauged with water, can be spread into thin layers. The following observed evidence is presented in support of this theory.

1. Cement thoroughly dispersed in kerosene settles rapidly by flocculation, whereas in the presence of a very small amount of oleic acid (one drop in one hundred cubic centimeters of kerosene) complete dispersion is effected, and the particles do not flocculate, but remain as individuals and settle slowly.

2. A cement ground with fifteen hundredths of one per cent of oleic acid is markedly more fluid.

3. The cement described above, in item two, is easily aerated, that is, easily filled with air so that its apparent density is greatly decreased. When pouring the cement from one container to another, an unusually large cloud of dust is produced.

4. The cement under discussion feels dry and fluffy to the touch.

5. The cement does not adhere to the grinding balls or to the walls of the mill.

plied to the surface thereof after setting. These properties combine to promote more satisfactory curing of the cement which leads to the attainment of greater strength, solidity and durability than are attained by other plastic cements under similar conditions. It has been found that cements ground with both oleaginous material and added inert material, in the manner above described, when mixed with water to form mortar or plaster, not only retaining a greater amount of the original water content during the curing of such mortar or plaster, but also more readily pick up or absorb moisture externally applied thereto during the curing period, than is the case with cements not prepared in this manner.

In order to illustrate this property of the above described cements, a series of comparative moisture retention tests were conducted on mortars of different compositions prepared from (1) a cement prepared by grinding clinker with 3.5% gypsum, and 0.15% oleic acid, and (2) a cement prepared from the same constituents plus 20% inert mineral material (sand). In conducting these tests, all the samples were prepared under uniform conditions and equivalent amounts of water were added in preparing the mortar samples of comparable cement:sand ratio. All of the samples were also subjected to similar drying conditions throughout the test period. In calculating the amount of sand necessary to produce the correct cement:sand ratio, in the case of samples prepared from cement No. 2, the sand present in the cement sample was included as part of the total sand in the mix, and the quantity of cement was taken as the actual amount of cement present including ground clinker plus gypsum. The results of these tests are given below in Table III.

TABLE III

| Mortar mix (cement:-sand) | Moisture retention (percentage of moisture originally present) | | | | | | | | Percentage improvement of No. 2 over No. 1 | | | |
|---|---|---|---|---|---|---|---|---|---|---|---|---|
| | Cement No. 1. (Clinker, gypsum and oleic acid) | | | | Cement No. 2. (Clinker, gypsum, oleic acid and sand) | | | | | | | |
| | 21 hrs. | 45 hrs. | 93 hrs. | 2 weeks | 21 hrs. | 45 hrs. | 93 hrs. | 2 weeks | 21 hrs. | 45 hrs. | 93 hrs. | 2 weeks |
| 1:3 | 21.0 | 20.3 | 20.3 | 20.3 | 26.0 | 24.6 | 23.9 | 24.6 | 23.8 | 21.2 | 17.7 | 21.1 |
| 1:4 | 20.7 | 20.1 | 19.5 | 20.1 | 24.4 | 22.0 | 21.4 | 22.0 | 17.8 | 9.5 | 9.7 | 9.5 |
| 1:5 | 19.0 | 18.0 | 17.4 | 18.0 | 23.8 | 21.0 | 20.0 | 20.5 | 25.3 | 18.8 | 15.0 | 13.9 |

Cement products produced as above-described have certain characteristic properties which make them highly advantageous in use as compared with ordinary Portland cement. When gauged wtih water they possess unusually high plasticity and workability, and are also capable of carrying a higher proportion of sand in the mix than can ordinarily be carried without destroying the proper working characteristics, setting behavior, and strength and durability of the product after setting. These advantages are enhanced by the use of the preferred proportions of oleaginous material and inert mineral material as above set forth, and by the grinding of the final mixture to the preferable degree of fineness, specific surface, and particle size distribution above mentioned.

Furthermore, these cement products possess an unusually high property, as compared with other plastic cements, of retaining moisture during curing and of picking up additional moisture ap- Another series of tests were conducted in order to determine more particularly the comparative abilities of cements prepared by grinding clinker with and without oleaginous material and inert mineral material, to pick up additional moisture after partial curing, and to retain the moisture so picked up. These tests were made on mortar pats prepared from 1:3 cement-sand mixes, using (1) a cement prepared by grinding clinker with 3.5% gypsum alone, (2) a cement prepared by grinding the same constituents plus 20% sand, (3) a cement prepared by grinding clinker, 3.5% gypsum, and 0.15% oleic acid, and (4) a cement prepared by grinding clinker, 3.5% gypsum, 0.15% oleic acid and 20% sand. Equivalent amounts of water were used in all cases. The mortar pats were allowed to air dry for a period of one month and the moisture content of each was then determined and reported as percent of original moisture content. The pats were then immersed in water for a period of one-half minute, then removed and again allowed to air dry and the moisture content thereof was determined after one and one-half hours, two and one-half hours and eighteen hours. These measurements were again reported as percentage of original moisture content. The results of these tests are given below in Table IV.

TABLE IV

*Moisture retention—percentage of original moisture content*

[All samples immersed in water for one-half minute at end of one month]

| Sample No. | Description of cement | One month (before immersion in water) | 1½ hrs. after immersion | Net gain due to immersion | 2½ hrs. after immersion | 18 hrs. after immersion |
|---|---|---|---|---|---|---|
| 1 | Clinker and gypsum | 19.7 | 49.4 | 29.7 | 43.4 | 27.7 |
| 2 | Clinker, gypsum and sand | 20.7 | 45.3 | 24.6 | 40.0 | 28.6 |
| 3 | Clinker, gypsum and oleic acid | 19.3 | 28.5 | 9.2 | 25.3 | 21.4 |
| 4 | Clinker, gypsum, oleic acid and sand | 21.9 | 31.8 | 9.9 | 29.8 | 25.2 |

It may be seen from the above table that at one and one-half hours after the emersion of the one month old pats in water, the sample No. 4 containing both oleaginous material and inert mineral material, retained a greater percentage of moisture than did sample No. 3 which contained oleaginous material but no inert mineral material. This difference in moisture content was also observed at the end of two and one-half hours and eighteen hours.

The beneficial effect obtained by the combined addition of oleaginous material and inert mineral material in the preparation of the cement of this invention may be due in part to the fact that the presence of sand in the grinding operation produces a more homogenous intermixing of the oleaginous material and cement clinker, and in part to the moisture retention properties of the finely ground sand itself, but regardless of the fundamental cause of this difference in behavier, it is a fact that this characteristic difference does exist.

This application is filed as a continuation in part of my application Serial Number 531,639 for Cement product and method of making the same, filed April 20, 1931.

I claim:—

1. A cement product comprising a finely ground mixture containing Portland cement and also containing inert mineral material other than Portland cement and a very small proportion of oleaginous material, said inert mineral material and oleaginous material being interground with the Portland cement.

2. A cement product comprising a finely ground mixture containing Portland cement and also containing an inert mineral material other than Portland cement and between .05% and 1% of fatty acid, said inert mineral material and fatty acid being interground with said Portland cement.

3. A cement product comprising a finely ground mixture containing Portland cement and also containing an inert mineral material other than Portland cement and between 0.1% and 0.5% oleic acid, said inert mineral material and oleic acid being interground with said Portland cement.

4. A cement product comprising a finely ground mixture containing Portland cement and also containing between 5 and 20% of inert mineral material and between .05% and 1% of oleic acid, said inert mineral material and oleic acid being interground with said Portland cement.

5. The method of making a Portland cement product which comprises preparing an intimate mixture consisting principally of Portland cement clinker and also containing inert mineral material other than Portland cement material and between .05% and 1% of oleic acid, and finely grinding said mixture.

6. The method of making a Portland cement product which comprises preparing an intimate mixture consisting principally of Portland cement clinker and also containing at least 5% of inert mineral material other than Portland cement and between .05% and 1% of oleaginous material, and finely grinding said mixture.

7. A cement product comprising a finely ground mixture containing Portland cement and also containing inert mineral material other than Portland cement and a very small proportion of solid oleaginous material, said inert mineral material and oleaginous material being interground with the Portland cement, and said oleaginous material consisting of a material which is solid at ordinary temperature but which is adapted to become liquid at the temperature of such intergrinding.

8. The method of making a Portland cement product which comprises mixing a solid oleaginous material with an inert mineral material other than Portland cement, in such manner as to cause said oleaginous material to become thoroughly intermixed with said inert mineral material, adding the resulting mixture to Portland cement clinker, and then grinding the mixture of oleaginous material, inert mineral material and clinker to finely divided condition.

HOWARD R. STARKE.